UNITED STATES PATENT OFFICE.

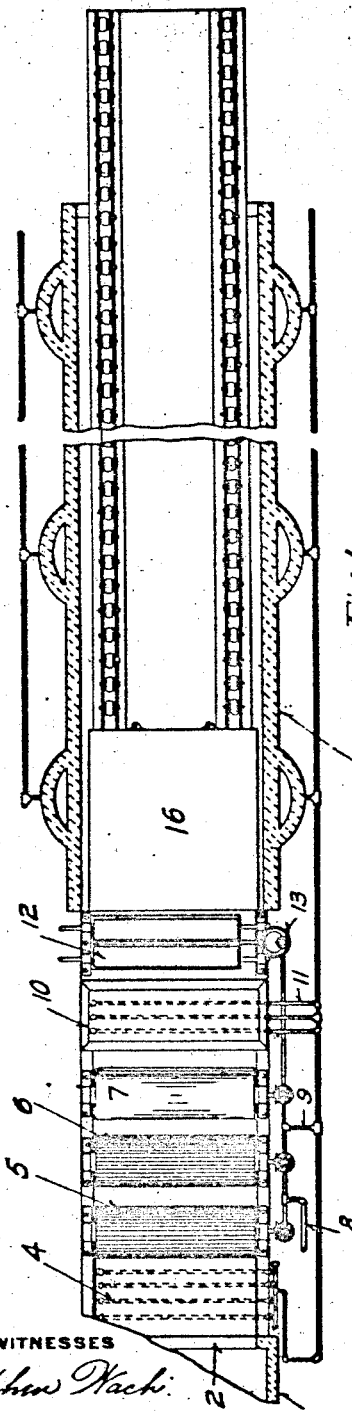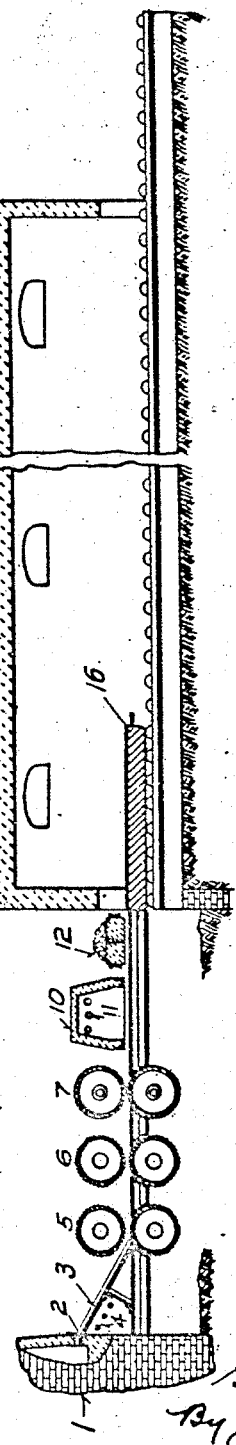

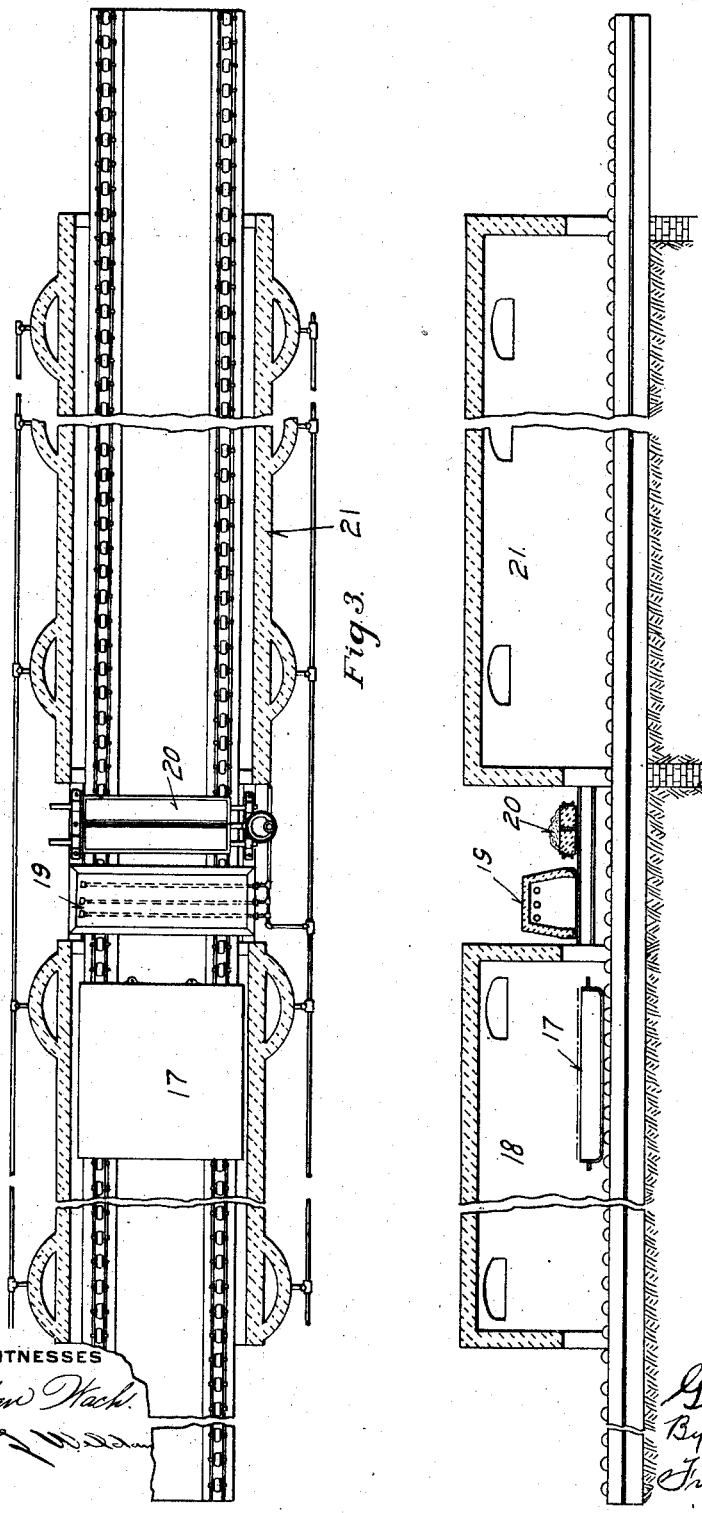

GEORGE C. DE BAY, OF TARENTUM, PENNSYLVANIA, ASSIGNOR OF ONE-HALF TO JOSEPH HEIDENKAMP, OF SPRINGDALE, PENNSYLVANIA.

METHOD OF MAKING POLISHED GLASS.

972,168.      Specification of Letters Patent.      Patented Oct. 11, 1910.

Application filed May 26, 1909. Serial No. 498,557.

*To all whom it may concern:*

Be it known that I, GEORGE C. DE BAY, a resident of Tarentum, in the county of Allegheny and State of Pennsylvania, have invented a new and useful Improvement in Methods of Making Polished Glass, (Case 2,) of which the following is a specification.

This invention relates to a method of forming polished glass in the form of sheets or plates and whereby glass having all of the qualities and characteristics of ground and polished plate glass can be produced quickly and cheaply.

The essential features of the invention consist in fire polishing the surfaces of the glass under such conditions and in such manner as to make the same perfectly smooth and without waves or other irregularities, the high glaze of the fire finish giving the necessary polish and producing glass in all essential particulars the same as polished plate glass, or if anything having a higher glaze or polish thereon.

The present method of manufacturing polished or what is known as plate glass consists in forming the plate, preferably by rolling, and afterward subjecting the same to a grinding and polishing action to give the desired smooth flat surface. The grinding and polishing is accomplished when the plate is cold and is a slow and rather expensive process and is the principal factor in the high cost of polished plate glass at present on the market.

It is well known that glass can be given a polish or highly glazed surface by fire finishing the same, that is, by subjecting the same to sufficient heat to practically melt the surface of the glass, and various small articles of glassware have heretofore been finished in that way. This method has, however, as far as I am aware, not been heretofore adapted for finishing large sheets or plates of glass on both surfaces. This, I believe, is due to the fact that the necessary heat for fire finishing is liable to leave a wavy or undulating effect on the surface of the glass and also to the difficulty of supporting the plate so as not to destroy the glaze or polish on the lower surface thereof.

My method has for its purpose to produce sheet or plate glass having all the qualities of cold polished plate glass by fire finishing both surfaces thereof. The invention comprises the process steps hereinafter described and claimed.

In the accompanying drawings Figures 1 and 3 are diagrammatic plan views of apparatus suitable for carrying out my method; and Figs. 2 and 4 are vertical sectional views of the same.

The apparatus shown includes a suitable furnace 1 for melting the glass and which may be either a tank or pot furnace or the like. The furnace shown is provided with a tank having a gate controlled slot 2 through which the molten glass escapes in the form of a thin wide stream of practically the form of a sheet or plate. This passes down over the chute or guide 3 which is supplied underneath with burners 4 for heating the same in order to maintain the glass in molten condition and so that it readily flows. The stream of glass passes in succession between three pairs of rolls 5, 6 and 7 which form the sheet to uniform thickness, compact the same and feed the same forward. The first pair of rolls 5 are slightly fluted or corrugated so as to impart a forward feed to the plate. The second pair of rolls 6 are also slightly corrugated for the same purpose, while the third pair of rolls 7 are smooth so as to press out the corrugations imparted to the sheet by the first two pair of rolls. The first pair of rolls and preferably also the second pair are water cooled internally, such as by means of the water pipes 8 in order to set the sheet or plate. The last pair of rolls is preferably heated, such as by the internal gas pipe 9, in order to keep up the temperature of the surface of the glass sheet. These rollers are mounted in a suitable table and can be driven by any suitable mechanism, the drawings showing shafts and bevel gears for this purpose. These rolls are only one form of plate forming mechanism which may be employed.

The upper surface of the sheet or plate is subjected to the fire finishing process preferably immediately after leaving the forming rolls, at which time the sheet or plate is still at a high temperature, so that the heat of fire finishing does not break the glass and it does not require such a great amount of heat to fire finish the surface. My invention, however, is not limited in this particular as the fire finishing can be accomplished on an already cold sheet or plate, in which case, however, the plate would first have to be gradually heated and a larger amount of heat would be necessary for fire finishing.

According to the present method the plate after being fire polished on its upper surface is annealed, is then turned upside down and fire polished on its other surface and again annealed, thus producing a plate fire polished on both surfaces.

Adjacent to the last pair of rolls 7 is a suitable heater or furnace 10 located above the course of the sheet or plate and serving to fire finish the top surface thereof. This furnace is provided with gas burners 11 and is lined with fire brick or the like and is maintained throughout at a very high heat, approximately at what may be called a glory-hole heat. The flame is not intended to strike the surface of the glass, but the latter is melted by the heat within the furnace. The temperature must be such as to quickly melt a thin skin on the surface of the plate so as to give the usual fire finish polish thereto. This, however, is likely to leave slight waves or undulations in the surface of the glass which would render it unfit as a substitute for polished plate glass without subsequent cold grinding or polishing which I wish to avoid. To smooth out such waves or undulations the surface of the glass while still plastic is subjected to a very light rubbing action by means of a block 12 reciprocated by means of eccentric 13. This block exerts only a very light pressure on the surface of the glass and is formed of any substance which will become heated so as not to chill the glass and which is perfectly smooth and non-porous so as to have no scratching effect on the glass, and no adhesion to hot glass. Various substances for this purpose may be used. A smooth steel surface will answer the purpose, but with very high heats there might be a tendency of the glass to adhere thereto. A block of oak wood will answer. I prefer a mixture of fine smooth carbon, such as charflake, with a suitable binder therefor, such as plaster of paris, and such as described and claimed in application of even date herewith, Serial No. 498,555. The rubbing action of this device smooths out the waves or undulations or other irregularities and gives a perfectly flat surface to the glass, free from all scratches or scores and without in any manner affecting the polish given by the fire finish, so that when the surface cools a perfectly smooth polish effect is left. The plate with its upper surface fire polished as described is then annealed. Any suitable form of annealing apparatus may be used, the drawing showing merely diagrammatically a long annealing oven 15 through which the plate is carried on the conveyer or carriages 16. The annealing oven will be heated in any suitable way so that the temperature of the plate is gradually reduced to the exit end of the oven, and the plate emerges therefrom properly annealed, and with a highly finished upper surface. This plate is then turned upside down and placed upon a suitable carriage 17, and is then subjected to fire polishing upon its now upper surface and then again annealed. It is first gradually heated, such as by passing through an oven 18, so that it will not break when subjected to the fire polishing. The fire polishing on its upper surface is accomplished by a furnace 19 exactly similar to the furnace 10, and is immediately subjected to a very light rubbing action by block 20 similar to the block 12, to smooth out the waves or irregularities of the newly melted surface. The plate is then annealed by carrying the same through annealing oven 21.

In order to prevent clouding or marring the surface of the plate first polished and upon which it is supported while undergoing the second polishing step it is necessary to provide the carriage conveyer with a suitable supporting platform which will not scratch the polished surface of the glass, which has no affinity for or tendency to adhere to the hot glass, and which is perfectly smooth and non-porous. The platform of buggy 17 is formed of the same composition as the polishing blocks 12 and 20, namely, of a smooth substance non-abradant and non-adhesive to hot glass. This composition can be worked down perfectly smooth and flat and has no tendency to adhere to the plate under the heat of the glass of the second polishing step and the annealing thereof, and therefore will not cloud or dim the polished surface. Any suitable platform covered with a bed of fine carbon will answer the purpose.

The heat in the annealing oven is not sufficiently high to disturb the high glaze formed by the fire finishing.

By means of the process described the usual grinding and polishing is entirely omitted and this slow and expensive step in the manufacture of this kind of glass is avoided. The plates are of equal quality with those produced by the present expensive method, and if anything have a higher polish or glaze. The plates can be quickly and cheaply formed and at a cost very much lower than according to present methods of making polished plate glass. Plates of any desired size can be manufactured according to this method. The plate forming apparatus can easily be made as wide as the greatest width of plate to be formed, and plates of any desired length can be made by cutting off the flow or stream of molten glass at the tank at proper periods. The annealing oven must of course be of a width corresponding to the width of the widest plate to be annealed.

What I claim is:

1. The method of making polished glass consisting of forming a sheet or plate of glass, fire polishing the upper surface thereof, annealing said plate, then turning said plate upside down and fire polishing the other surface of the plate, and again annealing the same.

2. The method of making polished glass consisting in rolling plastic glass into a sheet or plate, fire finishing the upper surface thereof, then turning said plate upside down, and fire polishing its now upper surface.

3. The method of making polished glass consisting in rolling plastic glass into a sheet or plate, fire finishing the upper surface thereof, annealing the same, then turning said plate upside down and fire polishing its now upper surface, and again annealing the same.

4. The method of making polished glass consisting in forming a sheet or plate of glass, fire polishing the upper surface thereof and while still plastic smoothing said surface, then annealing the plate, turning said plate upside down, fire polishing the other surface of the glass, and while plastic smoothing the same and again annealing the plate.

5. The method of making polished glass consisting in forming a sheet or plate of glass, fire polishing the upper surface thereof, subjecting said surface while plastic to a light rubbing action to smooth the same, turning said plate upside down and fire polishing the other surface thereof, and while said surface is plastic subjecting the same to a light rubbing action to smooth the same.

6. The method of making polished glass consisting in forming a sheet or plate of glass, fire polishing the upper surface thereof, subjecting said surface while plastic to a light rubbing action to smooth the same, annealing said plate, turning said plate upside down and fire polishing the other surface thereof, and while said surface is plastic subjecting the same to a light rubbing action to smooth the same, and again annealing the same.

7. The method of making polished glass consisting in forming a sheet or plate of glass, fire polishing the upper surface thereof, turning said plate upside down and supporting the polished surface thereof on a smooth surface having no adhesion for warm glass, and then fire polishing the other surface of the plate.

8. The method of making polished glass consisting in forming a sheet or plate of glass, fire polishing the upper surface thereof, annealing said plate, turning said plate upside down and supporting the polished surface thereof on a smooth surface having no adhesion for warm glass, then fire polishing the other surface of the plate, and again annealing the same.

9. The method of making polished glass consisting in forming a sheet or plate of glass, fire polishing the upper surface thereof, annealing the plate, then turning the plate upside down and supporting its polished face on a body containing smooth non-abradant carbonaceous matter, then fire polishing the other face of the plate, and again annealing the same.

10. The method of making polished glass consisting in pouring a thin flat stream of glass to form a sheet, rolling the same to uniform thickness, fire polishing the upper surface of the plate, annealing the same, then turning the plate upside down, fire polishing the other surface, and again annealing said plate.

In testimony whereof, I have hereunto set my hand.

GEORGE C. DE BAY.

Witnesses:
F. W. WINTER,
JOHN S. CORT.